United States Patent
Ott

(10) Patent No.: US 12,248,098 B2
(45) Date of Patent: Mar. 11, 2025

(54) OPTICAL RANGE CALCULATION APPARATUS AND METHOD OF RANGE CALCULATION

(71) Applicant: Melexis Technologies NV, Tessenderlo (BE)

(72) Inventor: Andreas Ott, Erfurt (DE)

(73) Assignee: Melexis Technologies NV, Tessenderlo (BE)

( * ) Notice: Subject to any disclaimer, the term of this patent is extended or adjusted under 35 U.S.C. 154(b) by 1090 days.

(21) Appl. No.: 17/109,356

(22) Filed: Dec. 2, 2020

(65) Prior Publication Data

US 2021/0173054 A1    Jun. 10, 2021

(30) Foreign Application Priority Data

Dec. 10, 2019    (EP) .................................... 19214952

(51) Int. Cl.
*G01S 7/4865*    (2020.01)
*G01B 11/26*    (2006.01)
(Continued)

(52) U.S. Cl.
CPC ............ *G01S 7/4865* (2013.01); *G01B 11/26* (2013.01); *G01S 7/4808* (2013.01); *G01S 7/497* (2013.01);
(Continued)

(58) Field of Classification Search
CPC ................................ G01S 17/36; G01S 7/4865
See application file for complete search history.

(56) References Cited

U.S. PATENT DOCUMENTS 4,289,397 A    9/1981    Itzkan et al.
4,968,968 A *  11/1990    Taylor ................... G01S 7/4008
                                                          342/174
(Continued)

FOREIGN PATENT DOCUMENTS

DE    102016106511 A1    10/2016
DE    102018107801 A1    10/2018
EP          3961258 A1     3/2022

OTHER PUBLICATIONS

Southwell, W. H., "Wave-front estimation from wave-front slope measurements", Journal of the Optical Society of America (1917-1983) vol. 7, No. 8, p. 998, 1980. (Year: 1980).*

(Continued)

*Primary Examiner* — Yuqing Xiao
*Assistant Examiner* — Clara G Chilton
(74) *Attorney, Agent, or Firm* — HARNESS, DICKEY & PIERCE, P.L.C.

(57) ABSTRACT

An optical range calculation apparatus (100) comprises a light source configured to emit light in accordance with an indirect time of flight measurement technique. A photonic mixer cell (102) is configured to generate and store a plurality of electrical output signals respectively corresponding to a plurality of predetermined phase offset values applied (112) in accordance with the indirect time of flight measurement technique. A signal processing circuit (110, 124) is configured to process the plurality of electrical output signals in accordance with the indirect time of flight measurement technique in order to calculate a measurement vector and a measured phase angle from the measurement vector. The signal processing circuit (110, 124) is configured to calculate a phase angle correction value using reference illumination data and to apply the calculated phase angle correction value in order to correct the measured phase (Continued)

angle, and the signal processing circuit is configured to calculate a range using the corrected measured phase angle.

21 Claims, 9 Drawing Sheets

(51) Int. Cl.

| | | |
|---|---|---|
| G01S 7/48 | (2006.01) | |
| G01S 7/497 | (2006.01) | |
| G01S 17/36 | (2006.01) | |
| G01S 17/46 | (2006.01) | |
| G01S 17/89 | (2020.01) | |
| G01S 17/894 | (2020.01) | |

(52) U.S. Cl.
CPC .............. *G01S 17/36* (2013.01); *G01S 17/46* (2013.01); *G01S 17/89* (2013.01); *G01S 17/894* (2020.01)

(56) References Cited

U.S. PATENT DOCUMENTS

| | | | |
|---|---|---|---|
| 7,809,182 B2 * | 10/2010 | Kirschner | ............... G01S 17/89 382/103 |
| 7,936,449 B1 | 5/2011 | Bamji et al. | |
| 8,611,610 B2 | 12/2013 | Park et al. | |
| 2017/0041589 A1 | 2/2017 | Patil et al. | |
| 2019/0078996 A1 * | 3/2019 | Mehrle | .............. G01N 15/1429 |
| 2020/0371205 A1 | 11/2020 | Loesch et al. | |

OTHER PUBLICATIONS

Payne et al., Improved linearity using harmonic error rejection in a full-field range imaging system, Journal: Three-Dimensional Image Capture and Applications 2008, : 2008, ISSN: 0277-786X (Year: 2008).*

Feigin et al., Modeling "Wiggling" as A Multi-Path Interference Problem in AMCW ToF Imaging, Jul. 27, 2015, vol. 23, No. 15, DOI:10.1364/OE.23.019213, Optics Express 19213.

Lindner et al., "Time-of-Flight Sensor Calibration For Accurate Range Sensing", Computer Vision and Image Understanding, 114 (2010), 1318-1328.

Payne et al., "Improved Linearity Using Harmonic Error Rejection in a Full-Field Range Imaging System", SPIE-IS&T, vol. 6805, 68050D-1, Jan. 31, 2008.

European Search Report for European Application No. 19214952 dated Jun. 5, 2020.

U.S. Office Action for corresponding U.S. Appl. No. 17/117,303 mailed Dec. 19, 2023.

U.S Notice of Allowance issued on Jul. 11, 2024 for co-pending U.S. Appl. No. 17/117,303.

U.S Notice of Allowance issued on Oct. 23, 2024 for co-pending U.S. Appl. No. 17/117,303.

* cited by examiner

OPTICAL RANGE CALCULATION APPARATUS AND METHOD OF RANGE CALCULATION

CROSS-REFERENCE TO THE RELATED APPLICATION

This application claims priority, under 35 U.S.C. § 119, from European Patent Application Ser. No. 19/214,952.4, filed on Dec. 10, 2019, the disclosure of which is incorporated herein by reference in its entirety.

FIELD

The present invention relates to an optical range calculation apparatus of the type that, for example, is configured to emit light and process received reflected light in accordance with an indirect time of flight measurement technique. The present invention also relates to a method of range calculation, the method being of the type that, for example, employs an indirect time of flight measurement technique.

BACKGROUND

In so-called time-of-flight sensing systems and other systems, for example gaming console vision systems, it is known to employ an illumination source to illuminate a surrounding environment within a field of view of the illumination source, sometimes known as a "scene", and process light reflected by features of the scene. Such so-called LiDAR (Light Detection And Ranging) systems illuminate a scene with light using the illumination source, and detect light reflected from an object in the scene using a detection device, for example an array of photodiodes, some optical elements and a processing unit. Light reflected from the object in the scene is received by the detection device and converted to an electrical signal, which is then processed by the processing unit by application of a time-of-flight (ToF) calculation in order to determine the distance of the object from the detection device. Although different varieties of LiDAR system are known to be based upon different operating principles, such systems nevertheless essentially illuminate a scene and detect reflected light.

In this regard, the so-called "Flash LiDAR" technique, which is a direct ToF ranging technique, employs a light source that emits pulses of light that are subsequently reflected by features of the scene and detected by a detector device. In such a technique, the distance to a reflecting feature is calculated directly using a measured time for a pulse of light to make a round trip to the reflecting feature and back to the detector device. The pulses of light incident upon the detector devices are sampled in the time domain at a very high sampling rate. The signal path in the processing circuitry to implement such a technique therefore requires a high bandwidth for signals as well as a large silicon "real estate", i.e. such an implementation requires a relatively large area on a silicon wafer, which in turn limits the number of channels that can be supported on an integrated circuit. The practical spatial number of channels that such Flash LiDAR sensors can support is therefore usually below 100. To overcome this limitation, mechanical scanning systems are implemented requiring moving components.

Another known LiDAR system employs a so-called "indirect Time of Flight" (iToF) ranging technique. iTOF systems emit a continuous wave light signal and reflections of the continuous wave light signal are received by a detector device and analysed. Multiple samples, for example four samples, of the light reflected from a feature of the scene are taken, each sample being phase stepped by, for example, 90°. Using this illumination and sampling approach, a phase angle between illumination and reflection can be determined, and the determined phase angle can be used to determine a distance to the reflecting feature of the scene.

In iToF systems, high frequency signal processing (demodulation) occurs at the pixel level, and so the signal bandwidth post-pixel required to integrate a large number of pixels on the same chip is low. Consequently, iToF systems can support a larger number of channels and hence higher spatial resolution measurement than direct ToF systems. However, iToF systems have limited distance measurement capabilities. In this regard, to achieve low stochastic distance measurement errors, iToF systems require high modulation frequencies, which in turn lowers the distance range that can be measured unambiguously. For example, a 100 MHz modulation frequency results in an approximate unambiguous measurement range of 1.5 m. Also, a conventional iToF system is susceptible to errors due to multiple reflections and multiple propagation paths.

As explained above, iToF systems sample in respect of different applied phases. A typical iToF system comprises a buffer that stores analogue signals generated by a so-called photonic mixer device in respect of m phases employed for subsequent signal processing. A discrete Fourier transformation unit calculates a fundamental frequency of a complex signal stored by the buffer in terms of in-phase and quadrature components of the signals. Using the values of the in-phase and quadrature components, a phase angle of the complex signal and the amplitude can be calculated and the distance to an object can be solved using the phase angle information.

However, such amplitude modulated continuous wave type systems suffer from an inherent depth measurement error due to aliasing of the emitted light signal versus a reference signal correlation function. This is due to higher harmonics present in both the emitted light signal and the reference signal, which are not accounted for in modelling or measurement. This kind of error is known as wiggling or circular errors (see "Modeling "wiggling" as a multi-path interference problem in AMCW ToF imaging", Feigin et al., OSA Optics Express, 2015).

In order to obviate or at least mitigate for the errors, it is known to take a phenomenological approach to compensation for circular errors. In this regard, B-spline or lookup table-based correction methods are known, for example as described in "Time-of-Flight sensor calibration for accurate range sensing" (Lindner et al., Computer Vision and Image Understanding, 114 (2010), pages 1318-1328), for compensating an aggregation of error phenomena. However, such a technique is sensitive to changes in system properties, for example temperature and frequency used to modulate an optical illumination signal emitted by an optical source and demodulate an optical signal received by the photonic mixer device.

SUMMARY

According to a first aspect of the present invention, there is provided an optical range calculation apparatus comprising: a light source configured to emit light in accordance with an indirect time of flight measurement technique; a photonic mixer cell configured to generate and store a plurality of electrical output signals respectively corresponding to a plurality of predetermined phase offset values applied in accordance with the indirect time of flight measurement technique; a signal processing circuit configured to process the plurality of electrical output signals in accordance with the indirect time of flight measurement technique in order to calculate a measurement vector and a measured phase angle from the measurement vector; wherein the signal processing circuit is configured to calculate a phase angle correction value using reference illumination data and to apply the calculated phase angle correction value in order to correct the measured phase angle; and the signal processing circuit is configured to calculate a range using the corrected measured phase angle.

The reference illumination data may be a priori knowledge of a model of a waveform of the light emitted by the light source.

The apparatus may further comprise: a data store configured to store a plurality of input phase angles and a plurality of phase angle correction values respectively associated with the plurality of input phase angles; wherein the plurality of phase angle correction values may be pre-calculated using the model of the waveform of the light emitted by the light source; and the signal processing circuit may be configured to access the data store and provide the phase angle correction value corresponding to the measured phase angle and to apply the phase angle correction value to the measured phase angle to yield the corrected measured phase angle.

The data store may be configured to store a lookup table comprising the plurality of input phase angles and the plurality of phase angle correction values.

The model of the waveform of the light emitted by the light source may be used to calculate an estimated phase angle corresponding to a predetermined phase angle, and the phase correction value may be calculated from the estimated phase angle and the predetermined phase angle associated therewith.

The signal processing circuit may be configured to employ a first phase angle calculation technique and a second phase angle calculation technique; the signal processing circuit may be configured to select the first phase angle calculation technique to calculate a first phase angle correction as the phase angle correction value or the second phase angle calculation technique to calculate a second phase angle correction as the phase angle correction value in response to a total number of the plurality of predetermined phase offset values employed applied in accordance with the indirect time of flight measurement technique in a time frame.

The signal processing circuit may be configured to measure a slope time of a cycle of the light emitted and to use the measured slope to configure the model of the waveform of the light emitted.

The signal processing circuit may be configured to calculate a measured amplitude from the measurement vector having the measured phase angle calculated; and the signal processing circuit may be configured to apply an amplitude correction value to the measured amplitude to provide a corrected measured amplitude.

The model of the waveform of the light emitted by the light source may be used to calculate an estimated phase angle corresponding to a predetermined phase angle; and the model of the waveform of the light emitted by the light source may be used to calculate an estimated amplitude value of the measurement vector, the amplitude correction value being derived from the estimated amplitude value.

The amplitude correction value may also be derived from a mean of estimated amplitude values and the estimated amplitude value.

The signal processing circuit may be configured to employ a first amplitude calculation technique and a second amplitude calculation technique; the signal processing circuit may be configured to select the first amplitude calculation technique to provide a first amplitude correction value as the amplitude correction value or the second amplitude calculation technique to provide a second amplitude correction value as the amplitude correction value in response to a total number of the plurality of predetermined phase offset values employed applied in accordance with the indirect time of flight measurement technique in a time frame.

The data store may be configured to store a plurality of input phase angles and a plurality of amplitude correction values respectively associated with the plurality of input phase angles; the plurality of amplitude correction values may be pre-calculated using the model of the waveform of the light emitted by the light source; and the signal processing circuit may be configured to access the data store and provide the amplitude correction value corresponding to the measured phase angle and to apply the amplitude correction value to the measured amplitude to yield the corrected measured amplitude.

The signal processing circuit may be configured to measure a transient value corresponding to the light emitted by the light source during a calibration phase.

The transient value may be an average transient measured in respect of a plurality of periods of the light emitted.

The signal processing circuit may be configured to employ another indirect time of flight measurement technique to calculate a plurality of measurement vectors as reference measurements and to calculate a plurality of phase angles respectively from the plurality of measurement vectors; the another indirect time of flight measurement technique may have an associated precision greater than a precision of the indirect time of flight measurement technique used to calculate the measurement vector; and the signal processing circuit may be configured to employ the indirect time of flight measurement technique to measure another plurality of vectors and to calculate another plurality of phase angles respectively from the another plurality of vectors.

The reference measurements may be acquired in respect of a substantially static reference scene using the another indirect time of flight measurement technique and the another plurality of vectors may be generated in respect of the substantially static reference scene using the indirect time of flight measurement technique.

The apparatus may further comprise: a span of measurable ranges having an associated data set of phase angle errors; wherein the signal processing circuit may be configured to calculate a plurality of phase angle errors using the plurality of the phase angles and the another plurality of phase angles; the plurality of phase angle errors may provide corrections in respect of a portion of the span of measurable ranges; and the phase angle correction value calculated using the indirect time of flight measurement technique may relate to a range outside the portion of measurable ranges and within the span of measurable ranges and contributes to completing the data set of phase angle errors.

The data set of phase angle errors ay be completed using the calculated phase angle correction value, the plurality of phase angle errors and an interpolation technique.

The another indirect time of flight measurement technique may employ a greater number of phase offset samples than the indirect time of flight measurement technique, and the number of phase offset samples employed by the another indirect time of flight measurement technique may be odd.

The reference illumination data may be difference data calculated between an image of a substantially static reference scene acquired in a reference mode and another image of the substantially static reference scene acquired in a normal mode.

The normal mode may employ the indirect time of flight measurement technique and the reference mode may employ another time of flight measurement technique; a precision of the another indirect time of flight measurement technique may be greater than a precision of the indirect time of flight measurement technique.

The apparatus may comprise an array of photonic mixer cells comprising the photonic mixer cell. Each of the array of photonic mixer cells may be configured to contribute to the calculation of the plurality of phase angle correction values stored in the data store.

According to a second aspect of the invention, there is provided a method of range calculation comprising: a light source emitting light in accordance with an indirect time of flight measurement technique; a photonic mixer cell generating and storing a plurality of electrical output signals respectively corresponding to a plurality of predetermined phase offset values applied in accordance with the indirect time of flight measurement technique; a signal processing circuit processing the plurality of electrical output signals in accordance with the indirect time of flight measurement technique in order to calculate a measurement vector and a measured phase angle from the measurement vector; the signal processing circuit calculating a phase angle correction value using reference illumination data and applying the calculated phase angle correction value in order to correcting the measured phase angle; and the signal processing circuit calculating a range using the corrected measured phase angle.

According to a third aspect of the invention, there is provided a method of range calculation comprising: emitting light in accordance with an indirect time of flight measurement technique; generating and storing a plurality of electrical output signals respectively corresponding to a plurality of predetermined phase offset values applied in accordance with the indirect time of flight measurement technique; processing the plurality of electrical output signals in accordance with the indirect time of flight measurement technique in order to calculate a measurement vector and a measured phase angle from the measurement vector; calculating a phase angle correction value using reference illumination data and applying the calculated phase angle correction value in order to correcting the measured phase angle; and calculating a range using the corrected measured phase angle.

It is thus possible to provide an apparatus and method that are each capable of generating calculated angles with improved accuracy when calculated in accordance with an indirect time of flight measurement technique. The angles calculated are less susceptible to the effects of harmonics in a continuous wave illumination signal, especially in cases where the harmonic content is large.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
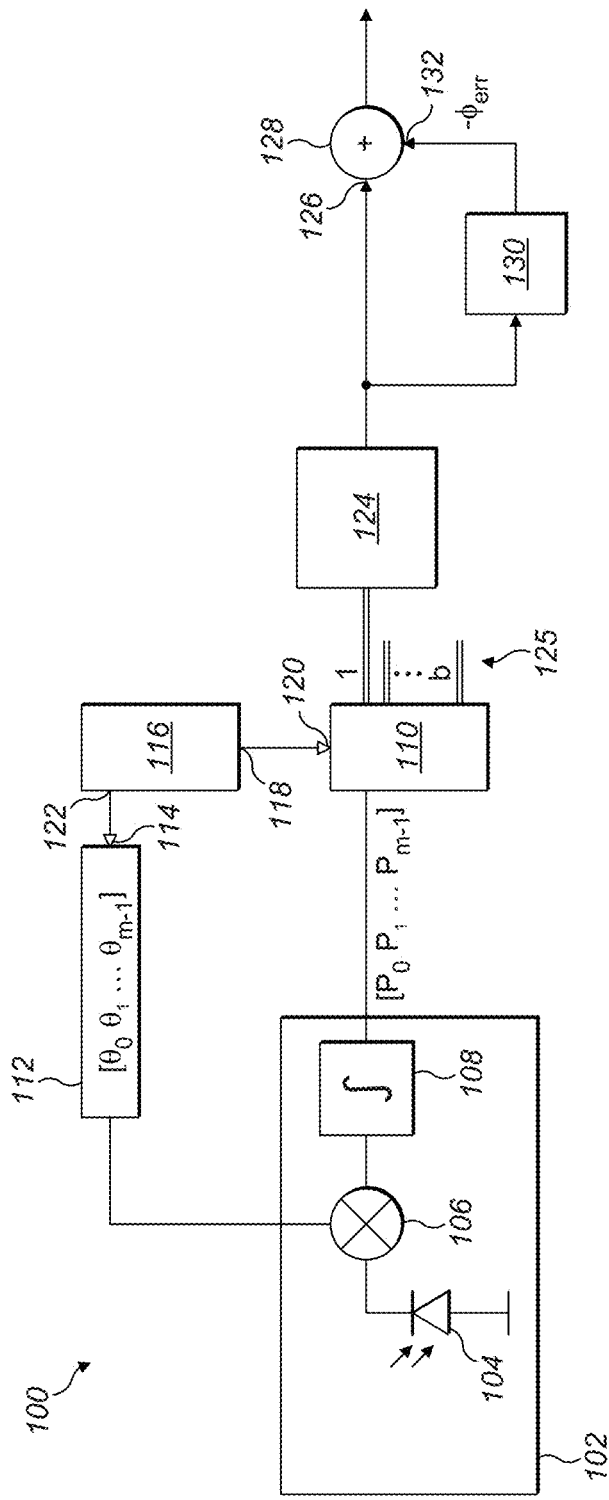
FIG. 1 is a schematic diagram of an optical range calculation apparatus constituting an embodiment of the invention.

Throughout the following description, identical reference numerals will be used to identify like parts.

Referring to FIG. 1, a first indirect time of flight range calculation apparatus 100 comprises a source of electromagnetic radiation (not shown), for example a Laser Diode (LD) or a Light Emitting Diode (LED). In this example, the source of electromagnetic radiation is infrared light that is amplitude modulated in accordance with an indirect time of flight measurement technique so as to be emitted as a continuous wave optical signal. A detection and ranging module of the apparatus 100 comprises an optical receiver photonic mixer pixel device 102, the optical receiver photonic mixer pixel device 102 comprising a photodiode 104 having an anode operably coupled to ground potential and a cathode coupled a first input of a photonic mixer 106, an output of the photonic mixer 106 being coupled to an input of an integrator 108. In this example, a single photonic mixer pixel device 102 is being described for the sake of conciseness and clarity of description. However, the skilled person will appreciate that the detection and ranging module comprises an array of photonic mixer pixel devices of the kind described above.

A phase signal generator 112 is configured to generate a continuous wave electrical signal. The phase offset of the continuous wave signal is selectable via a control input 114, the phase of the continuous wave signal being selectable from a set of phase offsets: $[\theta_0, \theta_1, \ldots, \theta_{m-1}]$. An output of the phase signal generator 112 is coupled to a second input of photonic mixer 106.

An output of the integrator 108 is coupled to an input of a Digital Fourier Transform (DFT) unit 110. In this respect, phase angle measurements are transferred serially to the DFT unit 110, thereby reducing memory requirements for the detection and ranging module. The DFT unit 110 comprises internal buffers (not shown) to support serial transfer of measurements from the integrator 108. In order to support this arrangement, the DFT unit 110 is operably coupled to a timing control unit 116 to maintain synchronisation of data processing.

The timing control unit 116 has a synchronisation output 118 operably coupled to a timing input 120 of the DFT unit 110. A control output 122 of the timing control unit 116 is coupled to the control input 114 of the phase signal generator 112.

The DFT unit 110 has a plurality of digital in-phase (I)/quadrature (Q) outputs 125. In this example, the DFT unit 110 comprises b pairs of digital I/O outputs corresponding to different harmonics of measured signals. As the output of the integrator 108 is an accumulated charge and, in this example in the analogue domain, the output of the integrator 108 needs to be converted to the digital domain. This can be achieved, for example, by employing a photon counter as the integrator 108 or providing an analogue-to-digital converter before the DFT unit 110.

A first pair of I/O outputs of the plurality of digital I/O outputs 125, relating to the first harmonic of the received reflected optical signal, is coupled to a phase angle calculation unit, for example an arctan unit 124. An output of the arctan unit 124 is coupled to a first input 126 of a summation unit 128. The summation unit 128 constitutes a combiner, the summation unit 128 having an output for providing a corrected phase angle. The output of the arctan unit 124 is also operably coupled to an input of a lookup table unit 130, supported by a data store, an output of the lookup table unit 130 being operably coupled to a second input 132 of the summation unit 128. In this example, the DFT unit 110, the arctan unit 124, the lookup table unit 130, the data store, and the summation unit 128 constitute a signal processing circuit.

Figure 2:
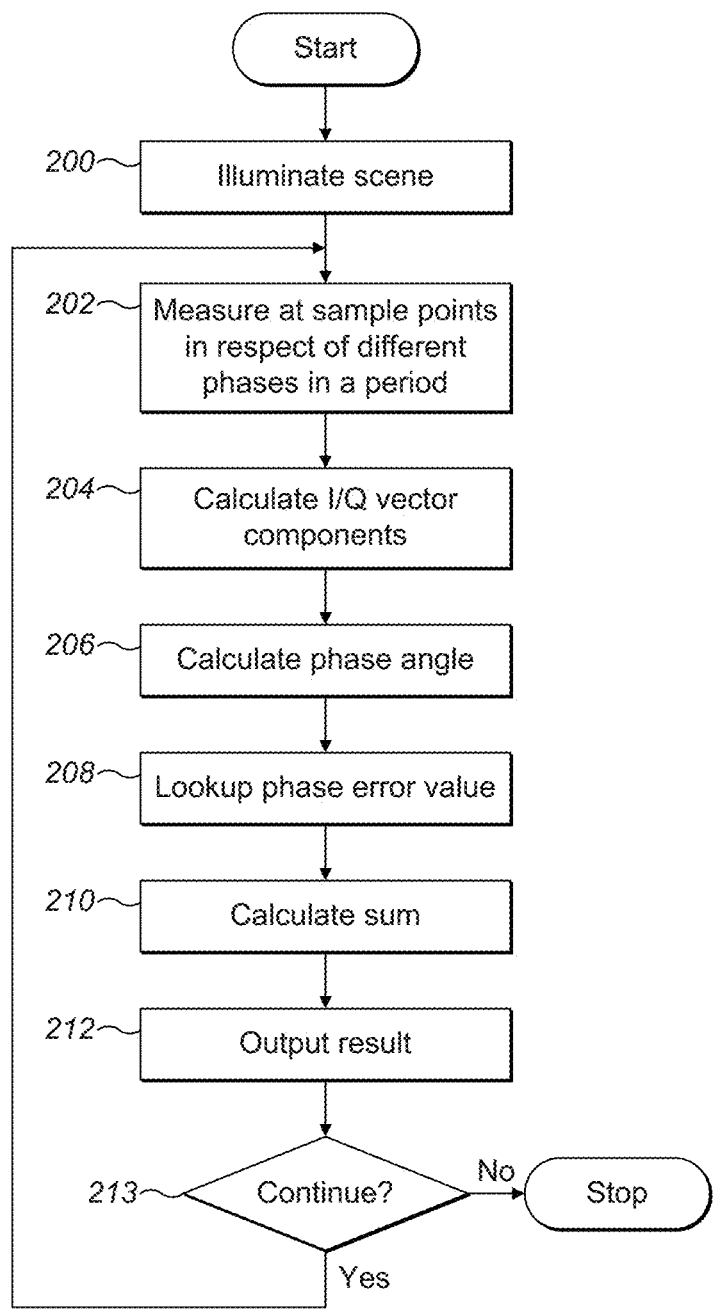
FIG. 2 is a flow diagram of a method of range calculation performed by the apparatus of FIG. 1 and constituting another embodiment of the invention.

In operation (FIG. 2), the light source emits a continuous wave optical signal that illuminates (Step 200) a scene. An object in the scene, for example, reflects the emitted optical signal. The phase signal generator 112 generates a continuous wave electrical signal, the timing control unit 116 controlling cycling through the set of phase offsets in respect of the electrical signal relative to the continuous wave optical signal. A synchronisation signal is also applied by the synchronisation output 118 to the DFT unit 110.

In order to calculate a corrected phase angle, a phase angle is calculated by applying the electrical signal generated by the phase signal generator 112 to the photonic mixer 106 and the phase offset of the electrical signal is cycled through the set of phase offsets mentioned above and digital representations of the charges stored in the integrator 108 in respect of each phase offset of the set of phase offsets are measured (Step 202) and received by the DFT unit 110 in series and converted to a pair of I/O outputs constituting an I/O vector (Step 204), V, representing the complex valued analogue electrical measurements in respect of the fundamental frequency. In this respect, the integrator 108 provides a plurality of phase-separated amplitude measurement outputs in series representing respective accumulated charge levels for applied phase offset values in respect of the photonic mixer pixel device 102. The DFT unit 110 calculates, for each frame cycle, intermediate I and Q values for phase-separated amplitude measurements respectively received in series, which are accumulated over a frame cycle to generate final I and Q value results. Operation of such an arrangement comprises vectors being calculated iteratively using the DFT unit 110 in respect of each incoming phase angle measurement.

The DFT unit 110 can also generate other I/O vectors in respect of harmonics of the charges measured by the integrator 108. After the electrical measurement signals are converted to the frequency domain, the I- and Q-values for the fundamental frequency are provided by the DFT unit 110 at the outputs thereof. In this example, the synchronisation signal ensures that the fundamental frequency I/O outputs of a current measurement frame of the DFT unit 110 are synchronously received by the arctan unit 124. The arctan unit 124 then, in accordance with the indirect time of flight measurement technique, calculates (Step 206) an angle of the vector, V, constituting an extracted (measured) calculated phase angle, $\varphi_{meas}$, in the complex plane from the fundamental frequency I and Q values.

The extracted phase angle, $\varphi_{meas}$, is received by the summation unit 128 as well as the lookup table unit 130. In response to receipt of the extracted phase angle, $\varphi_{meas}$, the lookup table unit 130 accesses (Step 208) a phase angle correction value, $\varphi_{err}$, corresponding to the value of the extracted phase angle, $\varphi_{meas}$, received and outputs the phase angle correction value, $-\varphi_{err}$, which is received by the summation unit 128 and applied (Step 210), for example added, to the extracted phase angle, (p meas, received and that corresponds to the phase angle correction value, $-\varphi_{err}$, retrieved by the lookup table unit 130. The combination of the extracted phase angle, $\varphi_{meas}$, with the phase angle correction value, $-\varphi_{err}$, yields a corrected phase angle, $\varphi_{cor}$, which is provided (Step 212) at an output of the summation unit 128. The corrected phase angle can then be used to calculate a range to the source of the reflection of the emitted light.

The above steps (Steps 202 to 212) are repeated (Step 213) until correction of measured angles is no longer required.

Figure 3:
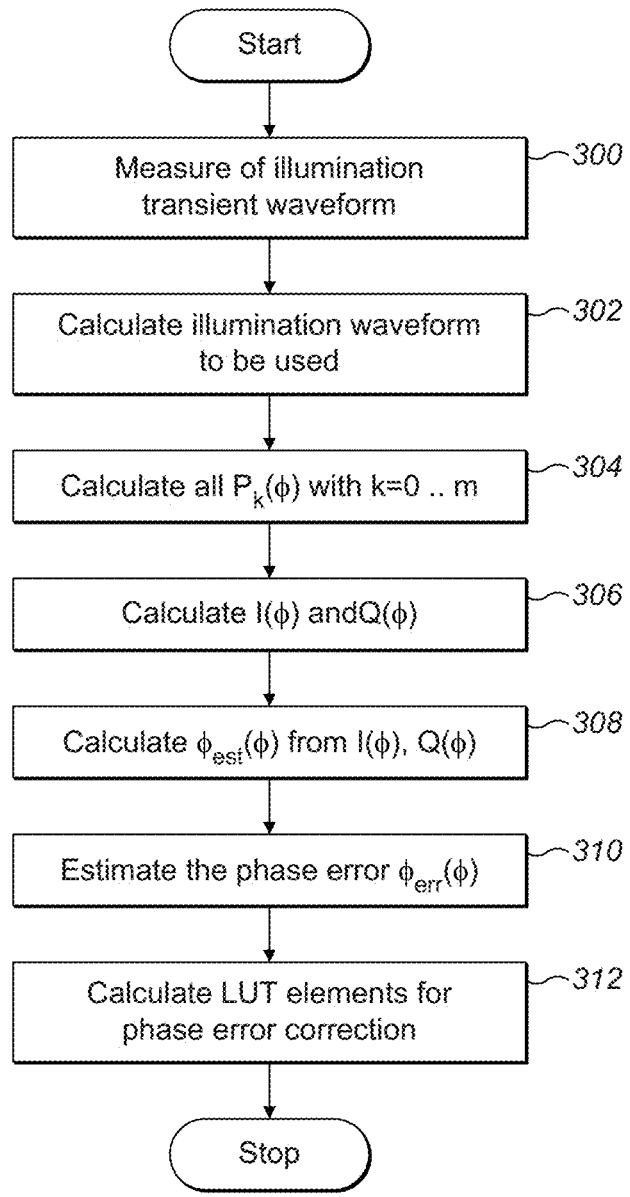
FIG. 3 is a flow diagram of a method of calculating phase angle error correction values constituting a further embodiment of the invention.
Figure 4:
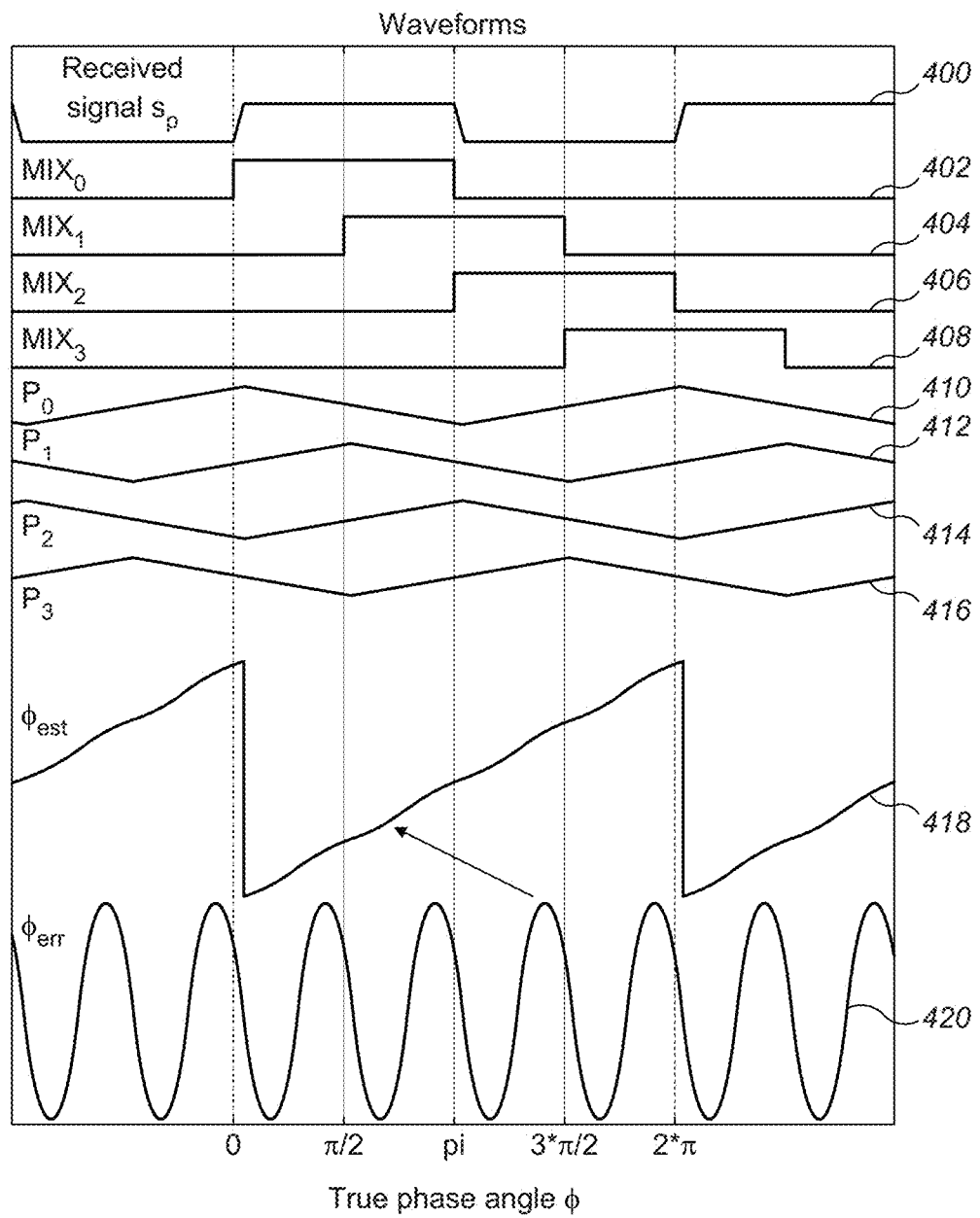
FIG. 4 is a series of graphs illustrating the waveforms involved in the calculation of the phase angle error correction values using the method of FIG. 3.

Turning to the lookup table unit 130, it has been discovered that with a priori knowledge of the transient of the emitted optical signal, it is possible to calculate phase angle error correction values to be applied to estimated phase angle measurements in order to correct the estimated phase angle measurements for circular errors. Referring to FIGS. 3 and 4, a model for the emitted optical signal, s(t), is selected, constituting reference illumination data. In this example, the model is based upon a convolution of a pair of rectangular functions:

$$s(t) = \frac{1}{t_s} rect\left(\frac{1}{t_p}\right) * rect\left(\frac{t}{t_s}\right) \tag{1}$$

s(t) is a convolution of an ideal rectangular waveform having a pulse duration, $t_p$, with another ideal rectangular waveform having a duration that can range between 0 to 100% of the slope time, $t_s$, of the waveform, for example the rise time or the fall time of the waveform. However, it should be appreciated that the model can be developed further by the skilled person, for example the above model assumes the waveform to possess equal rise and fall times, whereas different models can take into account the possibility of the waveform having different rise and fall times.

In order to characterise the model specific to the light emitted by the optical source, the slope time $t_s$ of the emitted optical signal is measured (Step 300), for example, once during end-of-line testing of the apparatus 100 during a calibration phase, for example during manufacture, or during use in the field in order to take into account operational parameter drifts that occur during the lifetime of the apparatus 100 and/or temperature effects. The slope time can be an average of a number of slope times measured over a plurality of periods of the emitted optical signal. By measuring the slope time, it is possible to obtain an indication of the bandwidth of the optical signal and the harmonics of the optical signal that lead to the circular errors. In this respect, a bandwidth-time product, $\Gamma$, is given by the following expression:

$$\Gamma = f_{mod} t_s \tag{2}$$

The bandwidth-time product, r, represents the ratio of slope time to the period of the optical signal.

Using the model of equation (1) above in respect of a theoretical time of flight range calculation system and as characterised (Step 302) by the measured slope time (Step 300) mentioned above, m measurements are made during a period of the optical signal, s(t), 400. This results in m different integration periods in respect of the integrator 108 and a sample point is obtained every $2\pi/m$ over a complete illumination period of the optical signal 400. Each sample point, $P_k$, where k=0, ..., m−1, is characterised over the period of the optical signal 400 as:

$$P_k(\phi) = s_p(\phi) * MIX_k(\phi) \tag{3}$$

where $$MIX_k(\phi) = rect\left(\frac{\phi}{\pi} - \frac{2k+2}{m}\right),$$

and $\phi$ the phase angle introduced by a time-of-flight path from the optical source of the apparatus 100 to an object in the scene and back to the optical receiver photonic mixer pixel device 102. Using the above expression (2), the sample points, $P_k(\phi)$, for each of k (=0, ..., m−1) phase angle shifted mixing signals 402, 404, 406, 408, are calculated (Step 304). As the skilled person will appreciate, the m sample points for a given period of the optical signal 400 are used to calculate (Step 306) in-phase and quadrature vector components, in this example in respect of the first harmonic of the optical signal 400, using a Fourier transform:

$$I(\phi) = \sum_{k=0}^{m-1} P_k(\phi) \cos(\theta_k) \tag{4}$$

$$Q(\phi) = \sum_{k=0}^{m-1} P_k(\phi) \sin(\theta_k) \tag{5}$$

where $\theta_k = 2\pi \frac{k}{m}$

Taking a four-phase system (m=4), a first sample point value, $P_0$, 410, a second sample point value, $P_1$, 412, a third sample point vale, $P_2$, 414, and a fourth sample point value, $P_3$, 416 are calculated, for example, as follows:

$$I(\phi) = P_0(\phi) - P_2(\phi) \tag{6}$$

$$Q(\phi) = P_1(\phi) - P_3(\phi) \tag{7}$$

From the in-phase and quadrature vector components, an estimate, $\phi_{est}(\phi)$, 418 of a current phase angle value, $\phi$, i.e. an estimate of the actual or ideal solution (the ground truth) for the phase angle value, $\phi$, for the in-phase and quadrature components of the vector, can be calculated (Step 308) using either, a first phase angle calculation technique, for example, an a tan 2 method, or a second phase angle calculation technique, for example a triangular method where the number of phase offsets employed by the phase signal generator 112 is four:

$$\phi_{est_{SIN}} = \begin{cases} atan2(Q(\phi), I(\phi)) & \text{if } Q(\phi) \geq 0 \\ atan2(Q(\phi), I(\phi)) + 2\pi & \text{if } Q(\phi) < 0 \end{cases} \tag{8}$$

-continued $$\phi_{est_{TRI}} = \begin{cases} \frac{\pi}{2}(1 - I_{norm}(\phi)) & \text{if } Q_{norm}(\phi) \geq 0 \\ \frac{\pi}{2}(3 + I_{norm}(\phi)) & \text{else} \end{cases} \tag{9}$$

where:

$$I_{norm}(\phi) = \frac{I(\phi)}{|I(\phi)| + |Q(\phi)|} \tag{10}$$

$$Q_{norm}(\phi) = \frac{Q(\phi)}{|I(\phi)| + |Q(\phi)|} \tag{11}$$

Where a four-phase system is employed, it is possible to select between the a tan 2 or the triangular method to estimate the phase angle based upon the configured model, depending upon the value of the bandwidth-time product, $\Gamma$. For example, if the bandwidth-time product, $\Gamma$, is less than about 0.2, use of the triangular method is more beneficial than the a tan 2 method. Then, using knowledge of the actual or predetermined phase angle, $\phi$, used when calculating the in-phase and quadrature components of the vector above, a phase angle error value, $\phi_{err}$, 420 is calculated (Step 310) for the estimated phase angle, $\phi_{est}$:

$$\phi_{err} = \phi_{est} - \phi \tag{12}$$

Applying the configured model to equation (3), equation (3) can be used with the expressions for calculating the in-phase and quadrature values mentioned above, as well as the appropriate equation for obtaining the estimated phase angle from the in-phase and quadrature components can be used with the above expression (equation (12)) to calculate the phase angle error value, $\phi_{err}$. This computational process constitutes a function to calculate (Step 312) the phase angle error value, $\phi_{err}$. The function is then used to calculate the estimated phase angle, $\phi_{est}$, and the corresponding phase angle error values, $\phi_{err}$, in respect of a predetermined number of "ground truth" phase angles. In this regard, the predetermined number of "ground truth" phase angles can be quantised values, for example 12-bit quantised phase angle values. The phase angle error values, $\phi_{err}$, are, in this example, translated, for example negated ($-\phi_{err}$) prior to storage in the lookup table unit 130 with the corresponding estimated phase angle, $\phi_{est}$, values.

Figure 5:
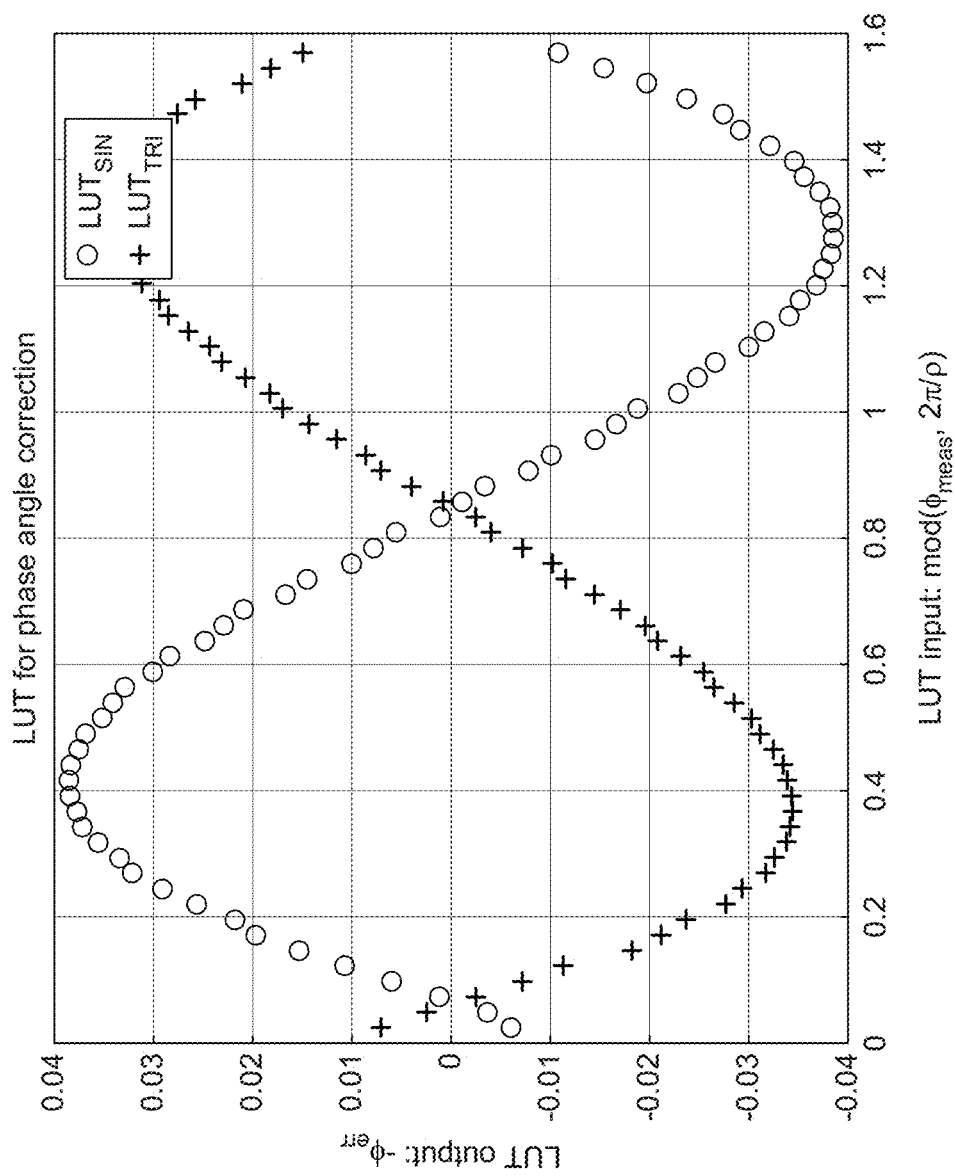
FIG. 5 is a graphic representation of a lookup table for phase angle correction employed by the apparatus and method of FIGS. 1 and 2, respectively.

Referring to FIG. 5, it can be seen that when plotting the estimated phase angle error values, $\phi_{est}$, against the calculated phase angle error values, $-\phi_{err}$, the change in calculated phase angle error value, $-\phi_{err}$, with estimated a.phase angle error values, $\phi_{est}$, is cyclic. In this regard, as the circular error is periodic, over a period of $2\pi$ in this example, the number of calculated values stored in the lookup table unit 130 can optionally be reduced by a factor of four. However, the skilled person should understand that if the model of the emitted optical signal is asymmetric, for example the model has differing rise and fall times and/or more generally an asymmetric envelope, an alternative to this simplification would typically need to be employed. In this regard, storage of all calculated values based on the asymmetric model would need to be stored for subsequent access owing to the lack of symmetry in the model and therefore all the calculated phase angle error value, $-\phi_{err}$, would need to be stored.

Figure 6:
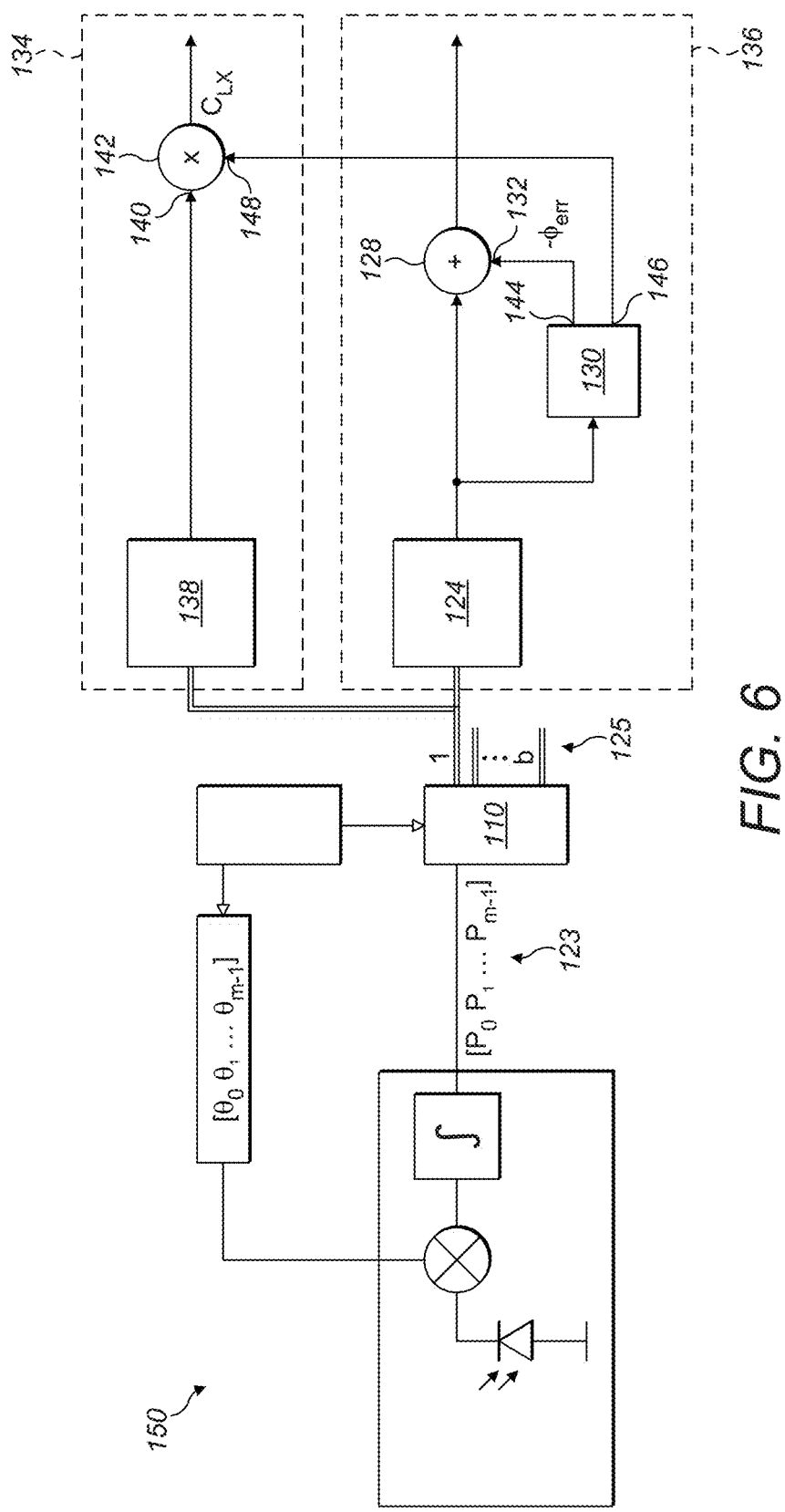
FIG. 6 is a schematic diagram of another optical range calculation apparatus constituting yet another embodiment of the invention.

In another example (FIG. 6), an amplitude calculation path 134 is added to the first indirect time of flight range calculation apparatus 100 of FIG. 1 to yield a second indirect time of flight range calculation apparatus 150. In this respect, and as already described above in relation to FIG. 1, a phase angle calculation path 136 is provided, the arctan unit 124, the lookup table unit 130 and the summation unit 128 being in the phase angle calculation path 136. The amplitude calculation path 134 is disposed in parallel with the phase angle calculation path 136 and receives an output from the lookup table unit 130. Like the arctan unit 124, the first pair of I/O outputs of the plurality of digital I/O outputs 125, relating to the first harmonic of the received reflected optical signal, is also coupled to an input of an amplitude calculation unit 138, an output of the amplitude calculation unit 138 being operably coupled to a first input 140 of a multiplier unit 142. In this example, the lookup table unit 130 comprises a first output 144 operably coupled to the second input 132 of the summation unit 128, and a second output 146 operably coupled to a second input 148 of the multiplier unit 142. The multiplier unit 142 also comprises an output for providing the product of a first signal and a second signal respectively applied to the two inputs thereof.

Figure 7:
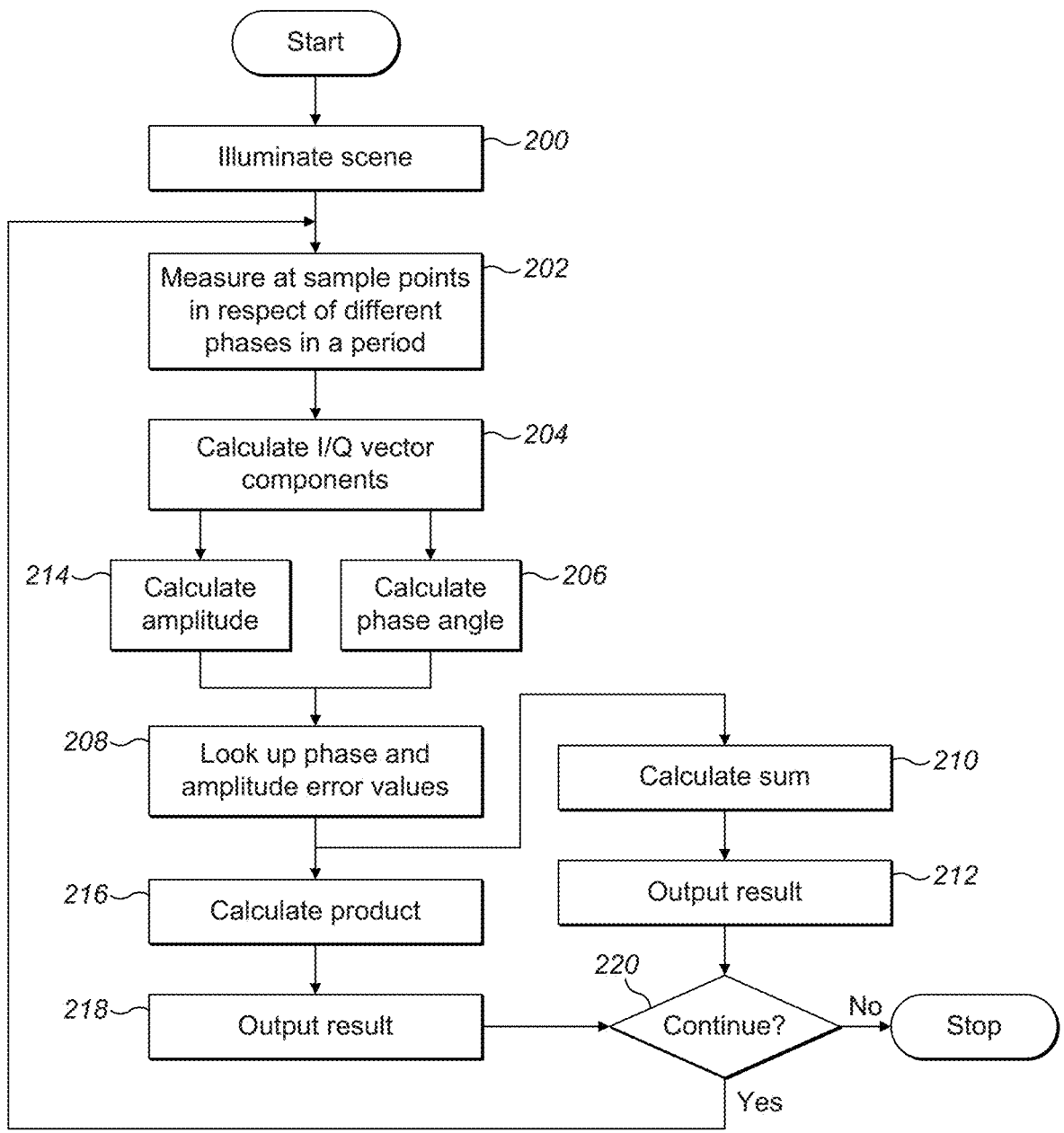
FIG. 7 a flow diagram of another method of range calculation performed by the apparatus of FIG. 6 and constituting further embodiment of the invention.

In operation (FIG. 7), the second indirect time of flight range calculation apparatus 150 operates in a like manner to the first indirect time of flight range calculation apparatus 100 of FIG. 1 in relation to the generation of the I/O components of the vector, V (Steps 200 to 204), and indeed in relation to the generation of the corrected phase angle value, $\varphi_{cor}$ (Steps 208 to 210). However, in addition to using the I/O components of the vector, V, to calculate the corrected phase angle value, $\varphi_{cor}$, the I/O components of the vector, V, are used by the amplitude calculation unit 138 to calculate (Step 214), in accordance with the indirect time of flight measurement technique, an amplitude of the vector, V, constituting an extracted (measured) amplitude, $Lx_{meas}$, in the complex plane from the fundamental frequency in-phase and quadrature values. The extracted amplitude, $Lx_{meas}$, is received by the multiplier unit 142. In response to receipt of the extracted angle, $\varphi_{meas}$, the lookup table unit 130 also accesses (Step 208) an amplitude correction value, $C_{Lx}$, corresponding to the value of the extracted angle, $\varphi_{meas}$, received and outputs the amplitude correction value, $C_{Lx}$, at the second output 146 of the lookup table unit 130, which is received by the multiplier unit 142 at the second input 148 thereof and multiplied (Step 216) with the extracted amplitude, $Lx_{meas}$, received at the first input 140 thereof and that corresponds to the amplitude correction value, $C_{Lx}$, retrieved by the lookup table unit 130. The multiplication of the extracted amplitude, $Lx_{meas}$, with the amplitude correction value, $C_{Lx}$, yields a corrected measured amplitude, $Lx_{cor}$, which is provided (Step 218) at the output of the multiplier unit 142.

The above steps (Steps 202 to 218) are repeated (Step 220) until correction of measured angles and amplitudes is no longer required.

Turning again to the lookup table unit 130, in this example as explained above, the phase angle error value, $-\varphi_{err}$, and the amplitude correction value, $C_{Lx}$, are retrieved with reference to the extracted phase angle, $\varphi_{meas}$. In common with the phase angle error value, $-\varphi_{err}$, it is possible to calculate the amplitude correction values, $C_{Lx}$, for the lookup table based upon the model of the optical signal (set out in equation (1) above) that is emitted by the optical source. In this regard, the in-phase and quadrature components of the vector, V, calculated above in relation to equations (4) to (7) are likewise used to calculate the amplitude correction value, $C_{Lx}$. As with the phase angle, more than one technique is available to calculate the amplitude of the vector, V: a first amplitude calculation technique, for example the Euclidean norm, L2, technique, and a second amplitude calculation technique, for example the so-called Taxicab norm (or Manhattan distance), L1, the latter technique lending itself better to four-phase systems where piece-wise linear segments of the in-phase (I($\varphi$)) and quadrature (Q($\varphi$)) components are used for phase angle extraction. For completeness, the amplitude of the vector, V, using the Euclidean norm, L2, technique is calculated as follows:

$$L2_{est} = \sqrt{I(\varphi)^2 + Q(\varphi)^2} \tag{13}$$

However, in the present example, the amplitude of the vector, V, is calculated using the Taxicab norm, L1, technique:

$$L1_{est} = |I(\varphi)| + ..Q(\varphi)| \tag{14}$$

which is already calculated in respect of the triangular phase angle calculation technique set forth above (equations (9), (10), (11)).

In a like manner to that performed above in relation to the calculation of the phase angle error value, $\varphi_{err}$, an amplitude correction value, $C_{Lx}$, is calculated using the measurement vector, V, and in-phase and quadrature values corresponding to a notional true phase angle, $\varphi$:

$$C_{Lx} = \frac{\text{mean}(Lx)}{Lx} \tag{15}$$

where x indicates the amplitude calculation technique used to calculate the amplitude of the measurement vector, V, and the amplitude corresponding to the notional true phase angle, $\varphi$.

Figure 8:
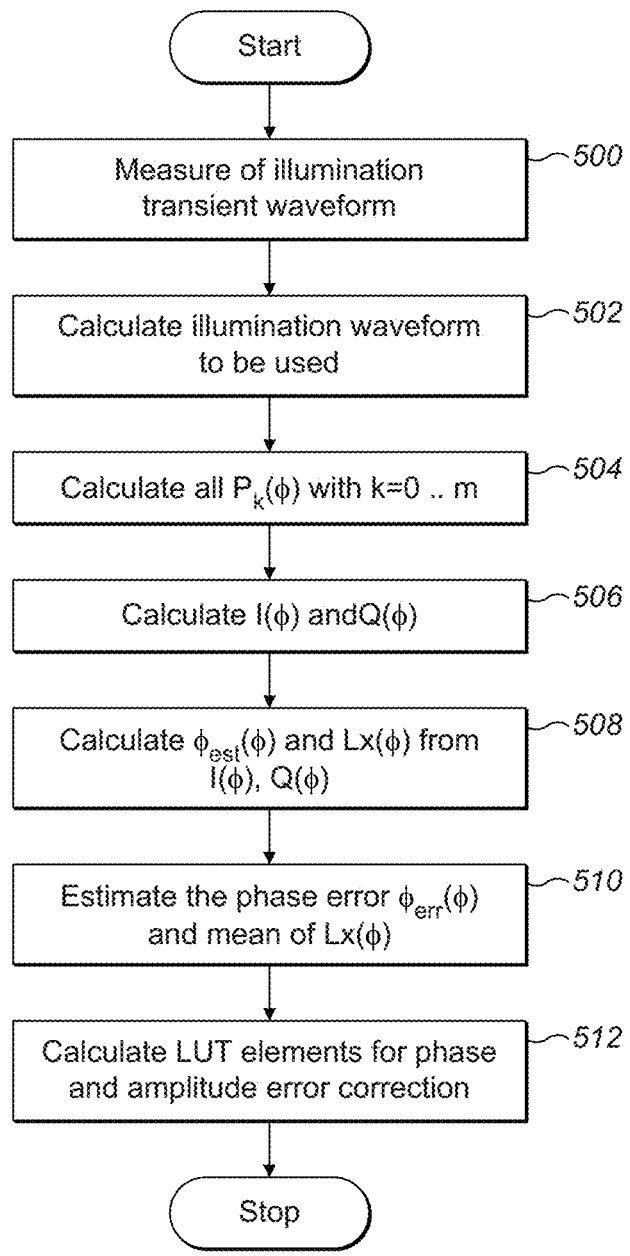
FIG. 8 is flow diagram of a method of calculating amplitude error correction values constituting yet a further embodiment of the invention.

Referring to FIG. 8, in order to characterise the model specific to the light emitted by the optical source, as in relation to the preceding example, the slope time of a cycle of the emitted optical signal is measured (Step 500), for example, once during end-of-line testing of the apparatus 100 during manufacture, or during use in the field in order to take into account operational parameter drifts that occur during the lifetime of the apparatus 100 and/or temperature effects. The slope time can be an average of a number of slope times measured over a plurality of periods of the emitted optical signal. By measuring the slope time, it is possible to obtain an indication of the bandwidth of the optical signal and the harmonics of the optical signal that lead to the circular errors.

Using the model of equation (1) above in respect of a theoretical time of flight range calculation system and as characterised (Step 502) by the measured slope time (Step 500) mentioned above, m measurements are made during a period of the optical signal, s(t), 400. This results in m different integration periods in respect of the integrator 108 and a sample point is obtained every 27/m over a complete illumination period of the optical signal 400. Each sample point, $P_k$, where k=0, ..., m−1, is characterised over the period of the optical signal 400 as set out in equation (3) above.

Using equation (3) above, the sample points, $P_k(\varphi)$, for each of k (=0, ..., m−1) phase shifted mixing signals 402, 404, 406, 408, are calculated (Step 504). The m sample points for a given period of the optical signal 400 are used to calculate (Step 506) in-phase and quadrature vector components, in this example in respect of the first harmonic of the optical signal, using a Fourier transform.

Taking the four-phase system (m=4) used above, the first sample point value, $P_0$, 410, the second sample point value, $P_1$, 412, the third sample point value, $P_2$, 414, and the fourth sample point value, $P_3$, 416 are used to calculate the in-phase, $I(\phi)$, and the quadrature, $Q(\phi)$, vector components according to equations (6) and (7) above.

From the in-phase and quadrature vector components, the estimated phase angle, $\phi_{est}(\phi)$, 418 as well as an estimated amplitude value, $Lx(\phi)$ for the current phase angle value, $\phi$, are calculated (Step 508) using either, for example, the arctan 2 method or the triangular method, and the Taxicab norm or the Euclidean norm method.

Depending upon the value of the bandwidth-time product, $\Gamma$, described above, the a tan 2 or the triangular method can be used to estimate the phase angle based upon the configured model. Likewise, depending upon whether an odd or even number of measurements are being made, the Taxicab norm or Euclidean norm method can be used to estimate the amplitude based upon the configured model. Then, using knowledge of the actual phase angle, $\phi$, used when calculating the in-phase and quadrature components of the vector, the phase angle error value, $\phi_{err}$, 420 is calculated (Step 510) for the estimated phase angle, $\phi_{est}$, in accordance with equation (12) above. Likewise, the amplitude correction value, $C_{Lx}$, is calculated (Step 510) for the estimated phase angle, $\phi_{est}$, in accordance with equation (15) above.

Applying the configured model to equation (3), equation (3) can be used with the expressions for calculating the in-phase and quadrature values mentioned above, as well as the appropriate equation for obtaining the estimated amplitudes from the in-phase and quadrature components, and the above expression (equation (15)) can be used to calculate the amplitude correction value, $C_{Lx}$. This computational process constitutes another function to calculate (Step 512) the amplitude correction value, $C_{Lx}$. The function already mentioned above is then used to calculate the estimated phase angle, $\phi_{est}$, and the corresponding phase angle error values, $\phi_{err}$, in respect of a predetermined number of "ground truth" phase angles. In this regard, the predetermined number of "ground truth" phase angles can be quantised values, for example 12-bit quantised phase angle values. The phase angle error values, $\phi_{err}$, are, in this example, translated, for example negated ($-\phi_{err}$) prior to storage in the lookup table unit 130 with the corresponding estimated phase angle, $\phi_{est}$, values.

Figure 9:
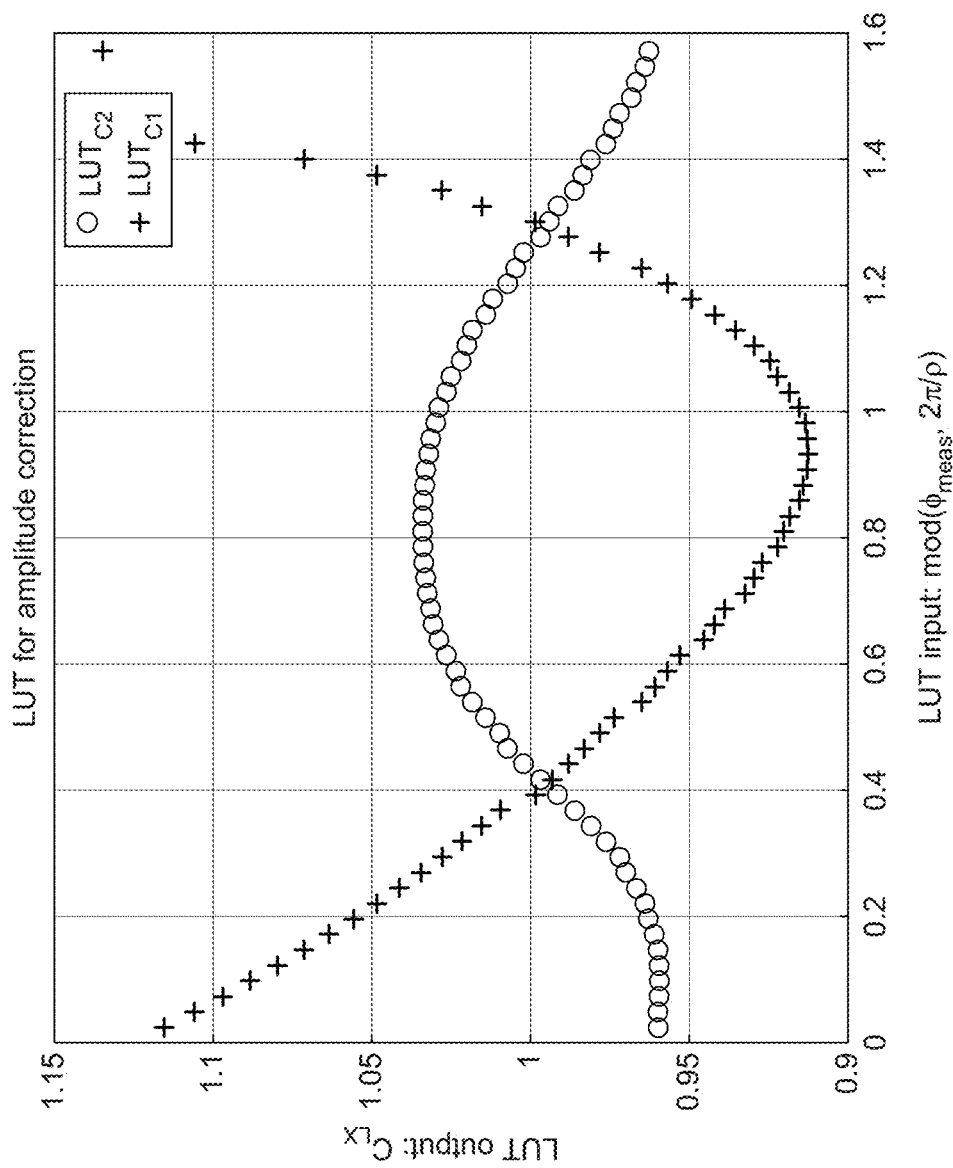
FIG. 9 is a graphic representation of another lookup table for amplitude correction employed by the apparatus and method of FIGS. 6 and 7, respectively.

Referring to FIG. 9, it can be seen that when plotting the estimated phase angle values, $\phi_{est}$, against the calculated amplitude correction values, $C_{Lx}$, the change in calculated phase angle correction value, $C_{Lx}$, with estimated phase angle error values, $\phi_{est}$, is also cyclic. However, as mentioned above, the skilled person should understand that if the model of the emitted optical signal is asymmetric, for example the model has differing rise and fall times and/or more generally an asymmetric envelope, an alternative to this simplification would typically need to be employed. In this regard, storage of all calculated values based on the asymmetric model would need to be stored for subsequent access owing to the lack of symmetry in the model and therefore the all calculated phase angle error value, $-\phi_{err}$, and all the calculated amplitude correction values, $C_{Lx}$, would need to be stored.

In another embodiment, a reference measurement can be made to calibrate the apparatus 100, for example during manufacture, in order to generate the lookup table data. In this regard, a reference measurement of a substantially reference static scene can be made using a higher precision measurement mode of the apparatus 100, 150, employing another indirect time of flight measurement technique, than the level of precision used during normal operation of the apparatus 100, 150 using the indirect time of flight measurement technique already described above. In this respect, the greater accuracy provided by the higher precision measurement mode is, in this example, attributable to a greater number of sample points being taken, $P_k$, by the higher precision indirect time of flight measurement technique, such as a greater number of measurements at equidistant phase offsets within a time frame than are taken during normal operation of the apparatus 100, 150. In such modes of operation, lower circular errors are expected. Optionally, the number of sample points can be odd.

Once acquired, the reference image is used in conjunction with a measurement of the same static reference scene in the normal mode of operation to calculate data points for the lookup table. In this respect, differences between amplitude values and/or phase angle values calculated using the higher precision mode and those values obtained using the normal mode of precision are used to generate the data points for the lookup table. For example, using such reference illumination data, the phase angle error values can be calculated as follows:

$$\phi_{err}(\phi_{ref}) = \phi_{normal}(\phi_{ref}) - \phi_{ref} \qquad (16)$$

where $\varphi_{err}(\phi_{ref})$ is the phase angle value error with respect to the reference in particular the phase angle value calculated in respect of the reference measurement, $\varphi_{normal}(\varphi_{ref})$ is the phase angle value calculated in respect of the measurement made using the normal precision mode, and $\phi_{ref}$ is the phase angle value calculated using the higher precision mode. In respect of amplitude error values, this can be calculated as follows:

$$Lx_{err}(\phi_{ref}) = \frac{Lx_{normal}(\phi_{ref})}{Lx_{ref}(\phi_{ref})} - 1 \qquad (17)$$

where $Lx_{err}(\phi_{ref})$ is the amplitude error value with respect to the reference measurement having a corresponding reference phase angle measurement value of $\phi_{ref}$, $Lx_{normal}(\phi_{ref})$ is the amplitude value calculated in respect of the amplitude measurement made using the normal precision mode, and $LX_{ref}(\phi_{ref})$ is the amplitude measurement made using the higher precision mode.

In a further example, the reference measurement can be made to calibrate the apparatus 100, for example during manufacture, in order to generate the lookup table data. However, for some applications, the lookup table data can benefit from supplementary data in respect of one or more ranges where the reference scene, for example, lacks one or more objects at the one or more ranges and hence data cannot be acquired. In this regard, the previously described technique for generating error values using the configured model of the light emitted by the light source can be employed in order provide additional error value data in respect of the one or more ranges.

In this regard, a first plurality of measurement vectors is calculated using the higher precision mode as reference measurements in respect of the substantially static reference scene and a first plurality of phase angles are respectively calculated from the first plurality of measurement vectors. Likewise, using the normal precision mode, a second plurality of measurement vectors is calculated and a second plurality of phase angles is respectively calculated from the second plurality of measurement vectors.

In this and the previous examples employing the reference scene, the reference scene is substantially static, or expressed differently quasi-static, between the measurement using the higher precision mode and the normal precision mode.

The apparatus 100 is capable of measuring ranges over a span of possible ranges (or a range of ranges) limited by the aliasing associated with the modulation frequency of the light source used. As explained above, the first plurality of the phase angles and the second plurality of phase angles are used to calculate a plurality of phase angle errors, constituting use of reference illumination data, the plurality of phase angle errors providing corrections in respect of a portion of, but not all, the span of measurable ranges. As also explained above, this can be on account of the reference scene lacking one or more objects at one or more ranges covered by the span of measurable ranges. A data set of phase angle error values associated with the span of measurable ranges is therefore incomplete. However, one or more calculations of measurement vectors corresponding to range values, outside the portion of the span of measurable ranges, are performed using the previously described technique for calculating phase angle error values using the configured model of the light emitted by the light source. The one or more calculated phase angle error values using this latter technique contribute to completion of the data set of phase angle error values.

Optionally, any suitable interpolation technique can be employed with the above-described techniques for generating the data set of phase angle error values. In this regard, the data set of phase angle error values can be completed using the one or more phase angle error values calculated using the model of the transient of the light emitted by the light source, the plurality of phase angle error values calculated using the reference scene and an interpolation technique.

In this example, and other examples set forth herein, when this measurement technique is employed (and preceding measurement techniques) in respect of an array of pixels, a plurality of amplitude error values and/or phase angle error values can be calculated for populating the data store in respect of the lookup table. However, the number of error values calculated depends upon the content of the static scene and so, in some examples, missing data points are calculated using known techniques, for example statistical techniques, such as for fitting available data points to complete a curve representing calculated error values stored in the lookup table.

The skilled person should appreciate that the above-described implementations are merely examples of the various implementations that are conceivable within the scope of the appended claims. Indeed, it should be appreciated that, for example, the technique described above employing the reference measurements can be used in conjunction with the technique described above where parameters of the emitted light are calculated during normal operation of the apparatus 100, 150.

It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

What is claimed is:

1. An optical range calculation apparatus comprising:
a light source configured to emit light in accordance with an indirect time of flight measurement technique;
a photonic mixer cell configured to generate and store a plurality of electrical output signals respectively corresponding to a plurality of predetermined phase offset values applied in accordance with the indirect time of flight measurement technique;
a signal processing circuit configured to process the plurality of electrical output signals in accordance with the indirect time of flight measurement technique in order to calculate a measurement vector and a measured phase angle from the measurement vector; wherein
the signal processing circuit is configured to calculate a phase angle correction value and to apply the calculated phase angle correction value in order to correct the measured phase angle;
the signal processing circuit is configured to calculate the phase angle correction value using a priori knowledge of a model of a transient of a waveform of the light emitted by the light source as reference illumination data, the model being pre-characterized by a measured slope time in respect of the light emitted by the light source; and
the signal processing circuit is configured to calculate a range using the corrected measured phase angle.

2. The apparatus according to claim 1, further comprising:
a data store configured to store a plurality of input phase angles and a plurality of phase angle correction values respectively associated with the plurality of input phase angles; wherein
the plurality of phase angle correction values is pre-calculated using the model of the waveform of the light emitted by the light source; and
the signal processing circuit is configured to access the data store and provide the phase angle correction value corresponding to the measured phase angle and to apply the phase angle correction value to the measured phase angle to yield the corrected measured phase angle.

3. The apparatus according to claim 2, wherein the data store is configured to store a lookup table comprising the plurality of input phase angles and the plurality of phase angle correction values.

4. The apparatus according to claim 1, wherein the model of the waveform of the light emitted by the light source is used to calculate an estimated phase angle corresponding to a predetermined phase angle, and the phase angle correction value is calculated from the estimated phase angle and the predetermined phase angle associated therewith.

5. The apparatus according to claim 1, wherein
the signal processing circuit is configured to employ a first phase angle calculation technique and a second phase angle calculation technique, the signal processing circuit being configured to select the first phase angle calculation technique to calculate a first phase angle correction as the phase angle correction value or the second phase angle calculation technique to calculate a second phase angle correction as the phase angle correction value in response to a total number of the plurality of predetermined phase offset values employed applied in accordance with the indirect time of flight measurement technique in a time frame.

6. The apparatus according to claim 1, wherein the signal processing circuit is configured to measure a slope time of a cycle of the light emitted and to use the measured slope to configure the model of the waveform of the light emitted.

7. The apparatus according to claim 1, wherein
the signal processing circuit is configured to calculate a measured amplitude from the measurement vector having the measured phase angle calculated; and
the signal processing circuit is configured to apply an amplitude correction value to the measured amplitude to provide a corrected measured amplitude.

8. The apparatus according to claim 7, wherein
the model of the waveform of the light emitted by the light source is used to calculate an estimated phase angle corresponding to a predetermined phase angle; and
the model of the waveform of the light emitted by the light source is used to calculate an estimated amplitude value of the measurement vector, the amplitude correction value being derived from the estimated amplitude value.

9. The apparatus according to claim 7, wherein
the signal processing circuit is configured to employ a first amplitude calculation technique and a second amplitude calculation technique, the signal processing circuit being configured to select the first amplitude calculation technique to provide a first amplitude correction value as the amplitude correction value or the second amplitude calculation technique to provide a second amplitude correction value as the amplitude correction value in response to a total number of the plurality of predetermined phase offset values employed applied in accordance with the indirect time of flight measurement technique in a time frame.

10. The apparatus according to claim 7, wherein
a data store is configured to store a plurality of input phase angles and a plurality of amplitude correction values respectively associated with the plurality of input phase angles;
the plurality of amplitude correction values is pre-calculated using the model of the waveform of the light emitted by the light source; and
the signal processing circuit is configured to access the data store and provide the amplitude correction value corresponding to the measured phase angle and to apply the amplitude correction value to the measured amplitude to yield the corrected measured amplitude.

11. The apparatus according to claim 1, wherein the signal processing circuit is configured to measure a transient value corresponding to the light emitted by the light source during a calibration phase.

12. The apparatus according to claim 4, wherein
the signal processing circuit is configured to employ another indirect time of flight measurement technique to calculate a plurality of measurement vectors as reference measurements and to calculate a plurality of phase angles respectively from the plurality of measurement vectors, the another indirect time of flight measurement technique having an associated precision greater than a precision of the indirect time of flight measurement technique used to calculate the measurement vector; and
the signal processing circuit is configured to employ the indirect time of flight measurement technique to measure another plurality of vectors and to calculate another plurality of phase angles respectively from the another plurality of vectors.

13. The apparatus according to claim 12, further comprising:
a span of measurable ranges having an associated data set of phase angle errors; wherein
the signal processing circuit is configured to calculate a plurality of phase angle errors using the plurality of the phase angles and the another plurality of phase angles, the plurality of phase angle errors providing corrections in respect of a portion of the span of measurable ranges; and
the phase angle correction value calculated using the indirect time of flight measurement technique relates to a range outside the portion of measurable ranges and within the span of measurable ranges and contributes to completing the data set of phase angle errors.

14. The apparatus according to claim 1, wherein the reference illumination data is difference data calculated between an image of a substantially static reference scene acquired in a reference mode and another image of the substantially static reference scene acquired in a normal mode.

15. A method of range calculation comprising:
a light source emitting light in accordance with an indirect time of flight measurement technique;
a photonic mixer cell generating and storing a plurality of electrical output signals respectively corresponding to a plurality of predetermined phase offset values applied in accordance with the indirect time of flight measurement technique;
a signal processing circuit processing the plurality of electrical output signals in accordance with the indirect time of flight measurement technique in order to calculate a measurement vector and a measured phase angle from the measurement vector;
the signal processing circuit calculating a phase angle correction value and applying the calculated phase angle correction value in order to correct the measured phase angle;
the signal processing circuit calculating the phase angle correction value using a priori knowledge of a model of a transient of a waveform of the light emitted by the light source as reference illumination data, the model being pre-characterized by a measured slope time in respect of the light emitted by the light source; and
the signal processing circuit calculating a range using the corrected measured phase angle.

16. The apparatus according to claim 2, wherein the model of the waveform of the light emitted by the light source is used to calculate an estimated phase angle corresponding to a predetermined phase angle, and the phase angle correction value is calculated from the estimated phase angle and the predetermined phase angle associated therewith.

17. The apparatus according to claim 2, wherein the signal processing circuit is configured to measure a slope time of a cycle of the light emitted and to use the measured slope to configure the model of the waveform of the light emitted.

18. The apparatus according to claim 1, wherein
the signal processing circuit is configured to calculate a measured amplitude from the measurement vector having the measured phase angle calculated; and
the signal processing circuit is configured to apply an amplitude correction value to the measured amplitude to provide a corrected measured amplitude.

19. The apparatus according to claim 2, wherein the signal processing circuit is configured to measure a transient value corresponding to the light emitted by the light source during a calibration phase.

20. An optical range calculation apparatus comprising:
- a light source configured to emit light in accordance with an indirect time of flight measurement technique;
- a photonic mixer cell configured to generate and store a plurality of electrical output signals respectively corresponding to a plurality of predetermined phase offset values applied in accordance with the indirect time of flight measurement technique;
- a signal processing circuit configured to process the plurality of electrical output signals in accordance with the indirect time of flight measurement technique in order to calculate a measurement vector and a measured phase angle from the measurement vector; wherein
- the signal processing circuit is configured to calculate a phase angle correction value using reference illumination data and to apply the calculated phase angle correction value in order to correct the measured phase angle;
- a model of a waveform of the light emitted by the light source is used to calculate an estimated phase angle corresponding to a predetermined phase angle, and the phase angle correction value is calculated from the estimated phase angle and the predetermined phase angle associated therewith;
- the signal processing circuit is configured to calculate a range using the corrected measured phase angle;
- the signal processing circuit is configured to employ another indirect time of flight measurement technique to calculate a plurality of measurement vectors as reference measurements and to calculate a plurality of phase angles respectively from the plurality of measurement vectors, the another indirect time of flight measurement technique having an associated precision greater than a precision of the indirect time of flight measurement technique used to calculate the measurement vector; and
- the signal processing circuit is configured to employ the indirect time of flight measurement technique to measure another plurality of vectors and to calculate another plurality of phase angles respectively from the another plurality of vectors.

21. The apparatus according to claim 20, further comprising:
- a span of measurable ranges having an associated data set of phase angle errors; wherein
- the signal processing circuit is configured to calculate a plurality of phase angle errors using the plurality of the phase angles and the another plurality of phase angles, the plurality of phase angle errors providing corrections in respect of a portion of the span of measurable ranges; and
- the phase angle correction value calculated using the indirect time of flight measurement technique relates to a range outside the portion of measurable ranges and within the span of measurable ranges and contributes to completing the data set of phase angle errors.

* * * * *